United States Patent [19]
Edwards et al.

[11] Patent Number: 6,076,717
[45] Date of Patent: Jun. 20, 2000

[54] PET REFUSE BAG DISPENSER ATTACHABLE TO A LEASH OR COLLAR

[76] Inventors: Timothy Edwards; Mary Edwards, both of 2090 Dewberry Ct., Westlake Village, Calif. 91361

[21] Appl. No.: 09/059,730

[22] Filed: Apr. 13, 1998

Related U.S. Application Data

[60] Provisional application No. 60/040,998, Apr. 21, 1997.
[51] Int. Cl.$^7$ ......................................................... B26F 3/02
[52] U.S. Cl. ................................ 225/6; 225/53; 225/106; 294/1.3
[58] Field of Search ................................ 225/106, 10, 39, 225/41, 77, 40, 42, 53, 6; 206/554, 806; 220/751, 729; 294/1.3; 221/61, 63, 155, 281

[56] References Cited

U.S. PATENT DOCUMENTS

| | | | |
|---|---|---|---|
| 2,652,054 | 9/1953 | Bishop | 220/751 |
| 4,095,729 | 6/1978 | Butera | 225/42 |
| 4,226,456 | 10/1980 | Barnett | 294/1.3 |
| 4,516,676 | 5/1985 | Cournoyer | 225/106 |
| 4,538,727 | 9/1985 | Soloway | 220/751 |
| 4,738,385 | 4/1988 | Bell | 225/106 |
| 5,050,760 | 9/1991 | Garcia | 220/751 |
| 5,064,233 | 11/1991 | Sloan . | |
| 5,135,134 | 8/1992 | Dancy | 225/106 |
| 5,265,785 | 11/1993 | Chudy . | |
| 5,363,809 | 11/1994 | Roe | 119/792 |
| 5,441,017 | 8/1995 | Lindsay | 119/795 |
| 5,540,469 | 7/1996 | Albert . | |
| 5,611,455 | 3/1997 | McCreary | 225/106 |
| 5,680,978 | 10/1997 | Pinion | 225/106 |
| 5,819,984 | 10/1998 | Krueger | 220/751 |

OTHER PUBLICATIONS

Poooch Conquer The World, Take Your Pooch!, Accrafect Products, Inc., two pages.
Leash Luggage "Keep our community Doo–Dee Free!", Leash Luggage, two pages.

*Primary Examiner*—M. Rachuba
*Attorney, Agent, or Firm*—Kelly Bauersfeld Lowry & Kelley, LLP

[57] ABSTRACT

A pet refuse bag dispenser attachable to a leash provides a device for conveniently carrying a roll of plastic bags when exercising one's pet. The dispenser includes a housing which defines an inner cavity and has an aperture therethrough which permits access to the inner cavity. The roll of plastic bags is disposed within the inner cavity such that the bags may be individually removed therefrom through the housing aperture. The plastic bags are wound about a tubular axle which is positioned centrally within the inner cavity of the housing such that the tubular axle, and thus the roll of plastic bags, may rotate therein. In one embodiment, the housing is formed of a cylindrical base into which the roll of bags is inserted, and a removable lid which encloses an open end of the cylindrical base. In another embodiment, the housing includes a blister pack affixed to a backing so as to capture the roll of plastic bags therebetween.

3 Claims, 3 Drawing Sheets

PET REFUSE BAG DISPENSER ATTACHABLE TO A LEASH OR COLLAR

This application claims benefit of provisional application No. 60/040,998 filed Apr. 21, 1997.

BACKGROUND OF THE INVENTION

This invention relates to devices for collecting animal litter. More specifically, the present invention relates to a pet refuse bag dispenser which is attachable to a leash or collar, that may be advantageously utilized to conveniently access a plastic bag into which animal litter may be placed when desired.

The rapid increase of urban population coupled with the increasing popularity of dogs and other pets has created a serious sanitary problem in connection with the disposal animal litter, and particular canine litter. Because many animal pet owners have permitted their animals to deposit solid excrement on both private and public property, a number of communities have enacted ordinances requiring pet owners, under penalty of fine, to retrieve and dispose of litter created by their pets.

It has been found that the willingness of pet owners to retrieve and properly dispose of animal litter is related to the ease, convenience and economy with which the litter may be handled in a clean and sanitary manner. While a number of devices have been proposed for the purpose of disposing of animal litter, they have suffered from various shortcomings. Some devices are not completely disposable and, therefore, require some degree of cleanup. Other types of devices, both of the disposable and reusable varieties, are awkward and/or conspicuous to carry. Moreover, some prior animal litter collection devices are too expensive for everyday use.

One commonly accepted method for collecting and storing animal litter until a proper disposal site can be found involves the use of a disposable plastic bag. Some pet owners will simply place a plastic bag, such as a plastic grocery bag, in a clothing pocket for retrieval when needed. This method of collecting animal litter presupposes, however, that the pet owner will always have access to and remember to grab a plastic bag prior to walking the pet. There have been proposals to provide devices which would store plastic bags within a container that may be worn by the owner or the pet. Each of these prior devices, however, suffers several disadvantages which the present invention is intended to overcome.

Accordingly, there is a need for a novel pet refuse bag dispenser which is inexpensive, lightweight and compact. Such a novel collection device would preferably easily attach to a leash, retractable leash device or collar and provide access to a roll of plastic bags when needed. The present invention fulfills these needs and provides other related advantages.

SUMMARY OF THE INVENTION

The present invention resides in a pet refuse bag dispenser which is inexpensive, lightweight and compact so that it can easily be attached to the leash or collar for a pet. The dispenser comprises, generally, a housing, a roll of plastic bags disposed within the housing, and means for centrally and rotationally retaining the roll of plastic bags within the housing.

More particularly, the housing defines an inner cavity and has an aperture therethrough which permits access to the inner cavity. The roll of plastic bags comprises a plurality of plastic bags which are connected end-to-end. The roll of plastic bags is disposed within the inner cavity of the housing such that the bags may be individually removed therefrom through the housing aperture. The means for centrally and rotationally retaining the roll of plastic bags within the housing includes a tubular axle about which the roll of plastic bags is wound. Further, means are provided for positioning the axle centrally within the inner cavity of the housing such that the tubular axle, and thus the roll of plastic bags, may rotate therein.

In one preferred form of the invention, the housing comprises a cylindrical base which has an open end through which the roll of plastic bags may be inserted into the inner cavity, and a removable lid for enclosing the open end of the cylindrical base. The lid preferably snap fits to the open end of the cylindrical base, and includes an eye loop extending outwardly therefrom. The eye loop provides means for connecting the pet refuse bag dispenser to the leash. Further, a hook is provided to which the bag may be attached, which extends from the housing. The axle positioning means comprises an upper axle guide which is integrally formed with the lid, and a lower axle guide formed with the cylindrical base.

In another preferred form of the invention, the housing comprises a blister pack which is affixed to a backing so as to capture the roll of plastic bags therebetween. In this embodiment, the axle positioning means comprises cylindrical flanges at opposite ends of the tubular axle. The roll of plastic bags is wound between the cylindrical flanges about the axle. The backing includes an aperture therethrough which provides means for connecting the pet refuse bag dispenser to a leash.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
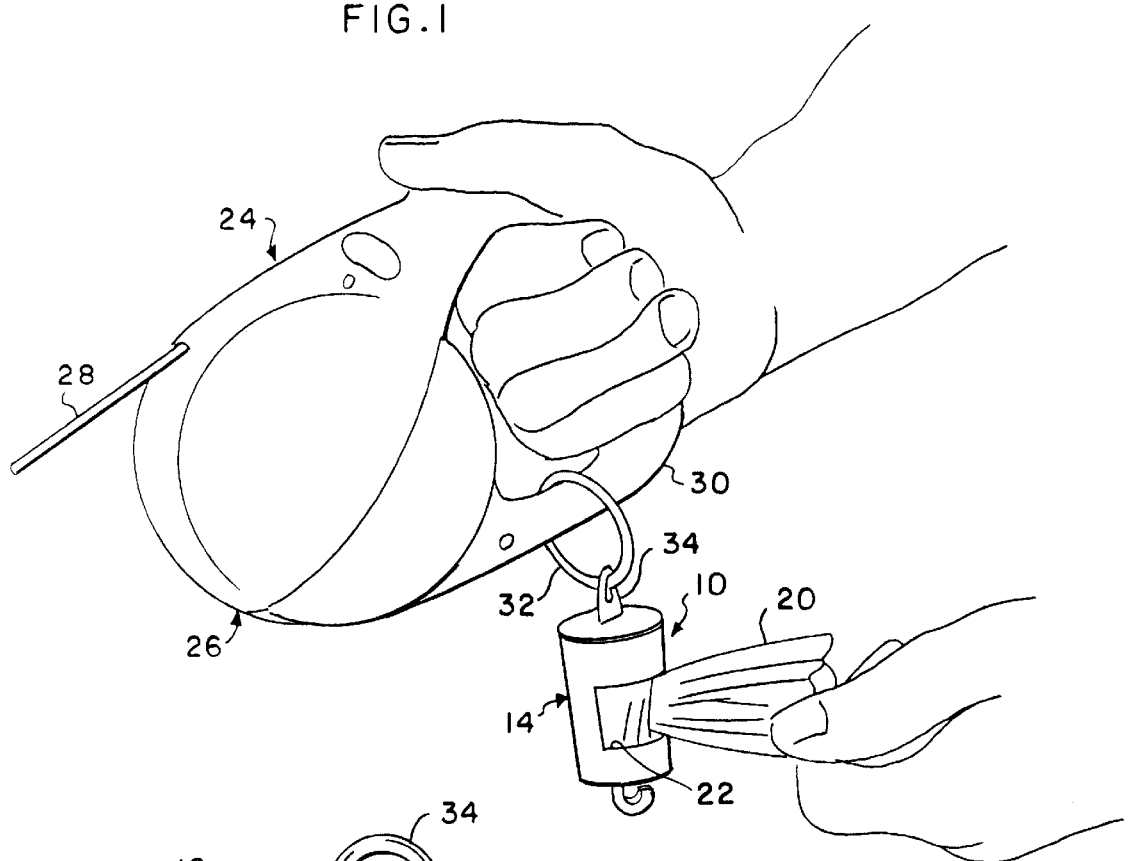
FIG. 1 is a perspective view of one embodiment of a pet refuse bag dispenser attached to a retractable leash device, illustrating the manner in which a plastic bag is withdrawn from the dispenser through an aperture in a housing thereof.
Figure 2:
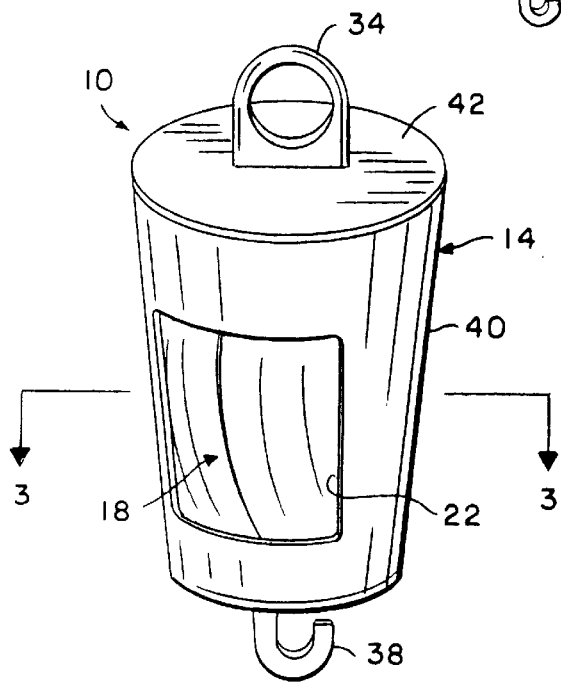
FIG. 2 is an enlarged top and side perspective view of the pet refuse bag dispenser illustrated in FIG. 1.
Figure 3:
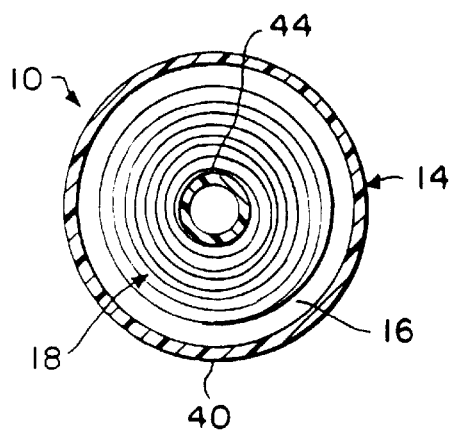
FIG. 3 is a horizontal section taken generally along the line 3—3 of FIG. 2, illustrating the positioning of a roll of plastic bags within a cylindrical base.
Figure 4:
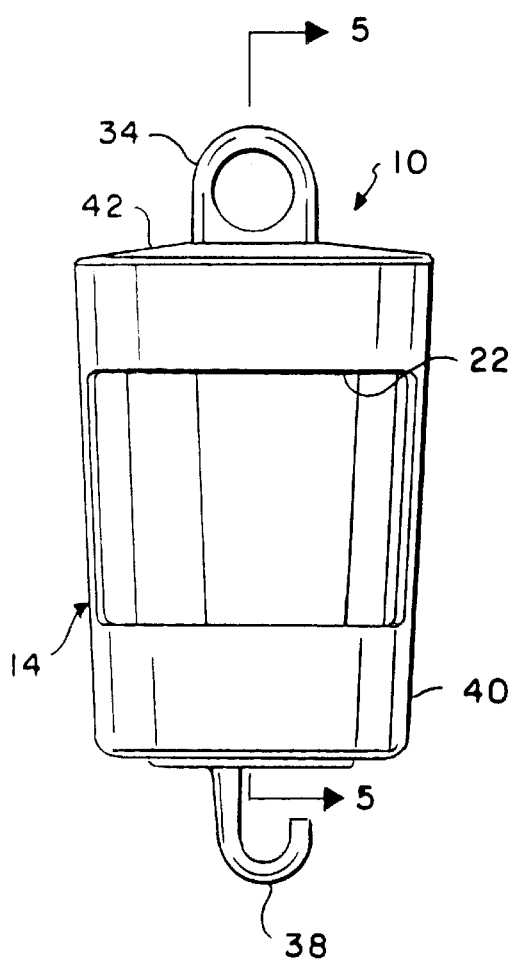
FIG. 4 is a side elevational view of the dispenser of FIGS. 1–3.
Figure 5:
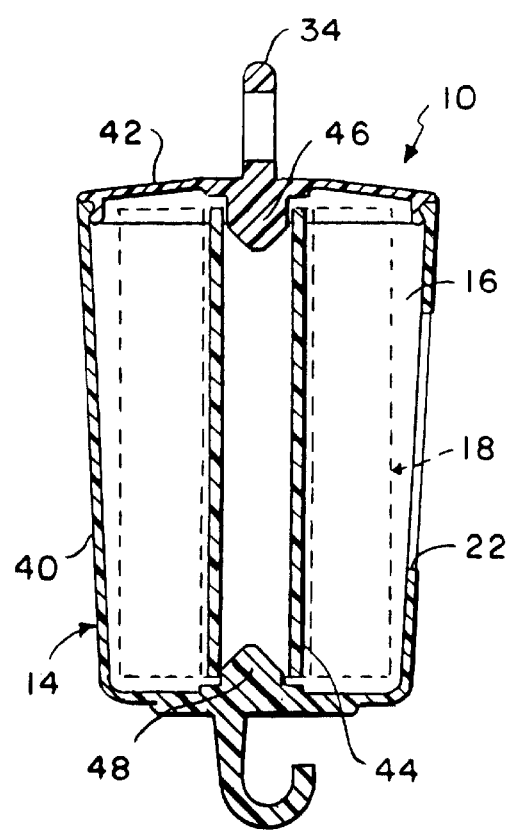
FIG. 5 is an elevational sectional view taken generally along the line 5—5 of FIG. 4.
Figure 6:
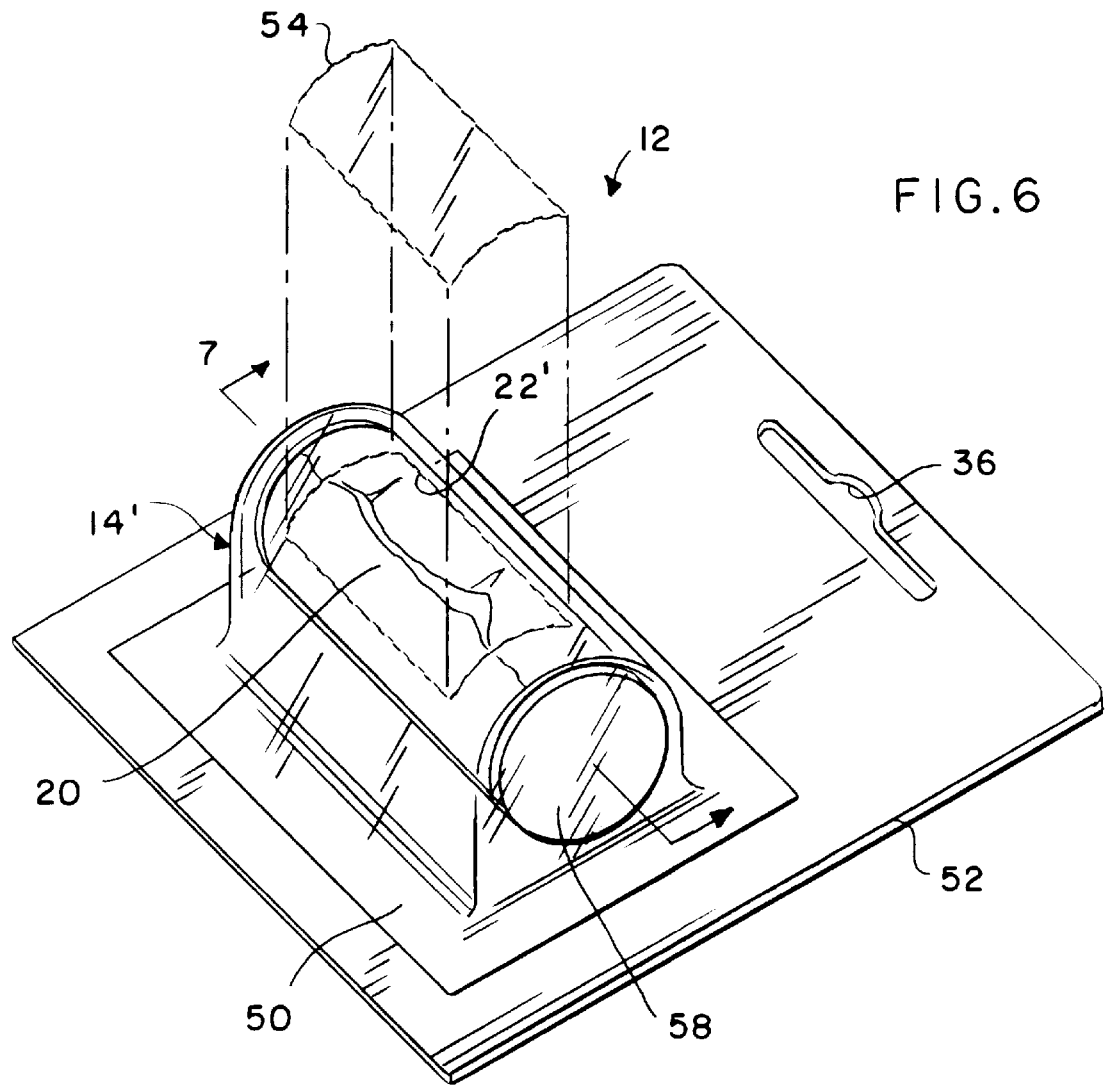
FIG. 6 is a perspective view of a second form of the pet refuse bag dispenser of the present invention, wherein the housing comprises a blister pack affixed to a backing so as to capture the roll of plastic bags therebetween.
Figure 7:
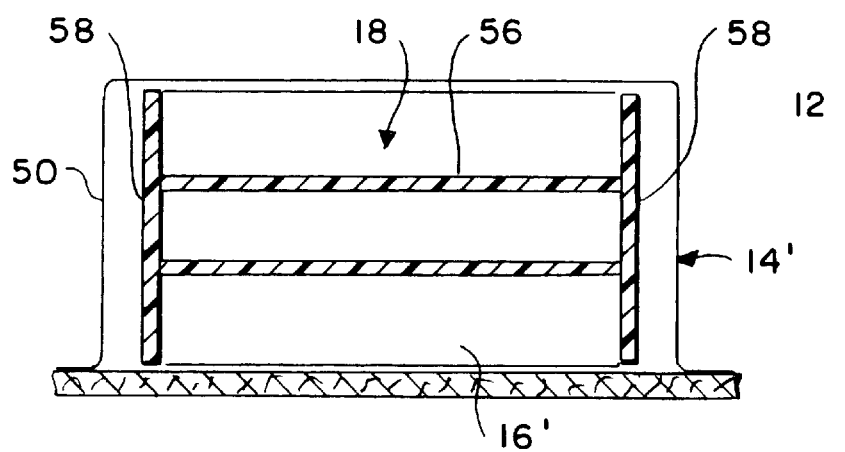
FIG. 7 is a sectional view taken generally along the line 7—7 of FIG. 6.

As shown in the drawings for purposes of illustration, the present invention is concerned with a pet refuse bag dispenser, generally illustrated in FIGS. 1–5 by the reference number 10 and in FIGS. 6 and 7 by the reference number 12. The pet refuse bag dispensers 10 and 12 each include a housing 14, 14' which defines an inner cavity 16, 16' for holding therein a roll 18 of a plurality of plastic bags 20 which are connected end-to-end. The roll 18 of plastic bags 20 is disposed within the inner cavity 16, 16' of the housing 14, 14' such that the bags may be individually removed therefrom through a housing aperture 22, 22'.

The pet refuse bag dispensers 10 and 12 are intended to be utilized in connection with a collar or a leash device 24 commonly utilized when walking one's pet. The exemplary leash device 24 illustrated in FIG. 1 comprises a leash housing 26 from which a retractable leash 28 extends. A handle 30 is formed with the leash housing 26, and a ring or bead tie 32 is utilized to connect the dispensers 10 and 12 conveniently to the leash device 24. In this regard, the pet refuse bag dispenser 10 illustrated in FIG. 1 includes an upper eye loop 34 integrally formed with the housing 14 through which the ring or bead tie 32 is placed to securely affix the dispenser 10 to the leash device 24. Alternatively, with regard to the pet refuse bag dispenser 12 of FIG. 6, an aperture 36 is provided through which the bead tie 32 may be placed to similarly affix the dispenser 12 to the leash device 24 or collar.

Referring now specifically to FIGS. 2–5, the pet refuse bag dispenser 10 of the present invention is generally cylindrical in shape having the aperture 22 provided in a side wall of the housing 14, with the eye loop 34 extending from an upper end of the housing 14 and a hook 38 extending downwardly from a lower end of the housing 14. The hook is provided to permit the user to place a knot tied in one of the plastic bags 20 after animal litter has been collected on one side of the hook 38 such that the weight of the litter within the bag will hold the plastic bag in place. This advantageously permits the user place the bag onto the dispenser 10 until a proper disposal site is reached. Of course, other forms of retainers, including clips and the like may be substituted for the hook 38.

The housing 14 comprises a cylindrical base 40 which has an open upper end through which the roll 18 of plastic bags 20 may be inserted into the inner cavity 16, and a removable lid 42 for enclosing the upper open end of the cylindrical base 40. As shown, the lid 42 snap-fits onto the open upper end of the cylindrical base 40.

The bag dispenser 10 further includes means for centrally and rotationally retaining the roll 18 of plastic bags 20 within the housing 14. This includes a tubular axle 44 about which the roll of plastic bags is wound, and means for positioning the axle centrally within the inner cavity 16 of the housing 14 such that the tubular axle, and thus the roll of plastic bags, may rotate therein. More specifically, the axle positioning means comprises an upper axle guide 46 which is integrally formed with the lid 42 and extends downwardly therefrom into the inner cavity 16, and a lower axle guide 48 that is integrally formed with the cylindrical base 40 and extends upwardly into the inner cavity 16. The tubular axle 44 is configured so that the ends thereof fit over the upper and lower axle guides 46 and 48 to be securely yet rotatably retained centrally within the inner cavity 16.

In use, fifteen or so plastic bags 20 are wound about the tubular axle 44 to form the roll 18. The lid 42 may be removed from the cylindrical base 40 to place the roll 18 within the inner cavity 16. The lower end of the tubular axle 44 is fitted over the lower axle guide 48. When the lid 42 is replaced over the open upper end of the cylindrical base 40 and snap-fit into place, the upper guide axle guide 46 is disposed within the upper end of the tubular axle 44. The end bag 20 of the roll 18 may then be accessed through the housing aperture 22 and withdrawn from the housing 14 as desired. The entire roll 18 of plastic bags 20 disposed on the tubular axle 44 will rotate within the housing 14 as the bags 20 are withdrawn therefrom. The bags are preferably releasably attached to one another such that one bag may be easily separated from another after being withdrawn from the dispenser 10, yet the bags are sufficiently attached to one another to prevent such separation as they are being withdrawn from the dispenser.

Referring now to FIGS. 6 and 7 an alternative form of the invention is illustrated wherein the housing 14', comprises a blister pack 50 which is affixed to a backing 52 so as to capture the roll 18 of plastic bags 20 therebetween. The blister pack 50 and the backing cooperatively define therebetween the inner cavity 16', and the housing aperture 22' is provided in a front face of the blister back 50. A cover 54 may be placed over the aperture 22' in the blister pack 50 to completely enclose the roll 18 of plastic bags 20 until it is desired to remove a plastic bag 20 for use.

As was the case in the prior embodiment, means are provided for centrally and rotationally retaining the roll 18 of plastic bags 20 within the housing 14'. Again, a tubular axle 56 is provided about which the roll of plastic bags is wound. At opposite ends of the tubular axle 56 are provided circular flanges 58. The circular flanges 58 provide means for positioning the axle 56 centrally within the inner cavity 16' of the housing 14' such that the axle 56, and thus the roll 18 of plastic bags 20, may rotate therein.

In operation, the pet refuse bag dispenser 12 operates in much the same manner as the dispenser 10 of FIGS. 1–5. The particular manner in which the dispenser 12 has been packaged, however, permits a single roll 18 of plastic bags 20 to be packaged for use in a housing 14 which is disposable once the last plastic bag 20 is utilized.

From the foregoing it will be appreciated that the pet refuse bag dispensers 10 and 12 described above can be manufactured economically and conveniently utilized in connection with any type of leash device 24 or collar to provide easy access to a number of plastic bags 20. The particular construction of the bag dispensers 10 and 12 facilitate easy removal of the bags 20 through a housing aperture 22, 22' by maintaining the axis of rotation of the roll 18 in a central position within the housing 14, 14'.

Although two embodiments of the invention have been described in detail for purposes of illustration, various modifications of each may be made without departing from the spirit and scope of the invention. Accordingly, the invention is not to be limited, except as by the appended claims.

We claim:

1. A pet refuse bag dispenser, comprising:

a housing including a cylindrical base having an open end, the housing defining an inner cavity and having an aperture therethrough permitting access to the inner cavity;

a removable lid for enclosing the open end of the cylindrical base, the lid including an eye loop extending outwardly therefrom, providing means for connecting the pet refuse bag dispenser to a leash;

a roll of a plurality of plastic bags connected end-to-end, disposed within the inner cavity of the housing and having a dimension greater than the aperture, the bags being individually removable from the housing through the aperture; and means for centrally and rotationally retaining the roll of plastic bags within the housing, including a tubular axle about which the roll of plastic bags is wound, and means for positioning the tubular axle centrally within the inner cavity of the housing including an upper axle guide integrally formed with and protruding from the lid and configured to be inserted into a first end of the tubular axle and, a lower axle guide integrally formed with and protruding from the cylindrical base and configured to be inserted into a second end of the tubular axle, such that the tubular axle, and thus the roll of plastic bags, may rotate within the housing.

2. The pet refuse bag dispenser of claim 1, wherein the lid snap-fits to the open end of the cylindrical base.

3. The pet refuse bag dispenser of claim 1, including hook means to which a bag may be attached, extending from the housing.

* * * * *